S. ANDERSON.
TABLE SERVICE DEVICE.
APPLICATION FILED JULY 22, 1911.
1,022,290.
Patented Apr. 2, 1912.
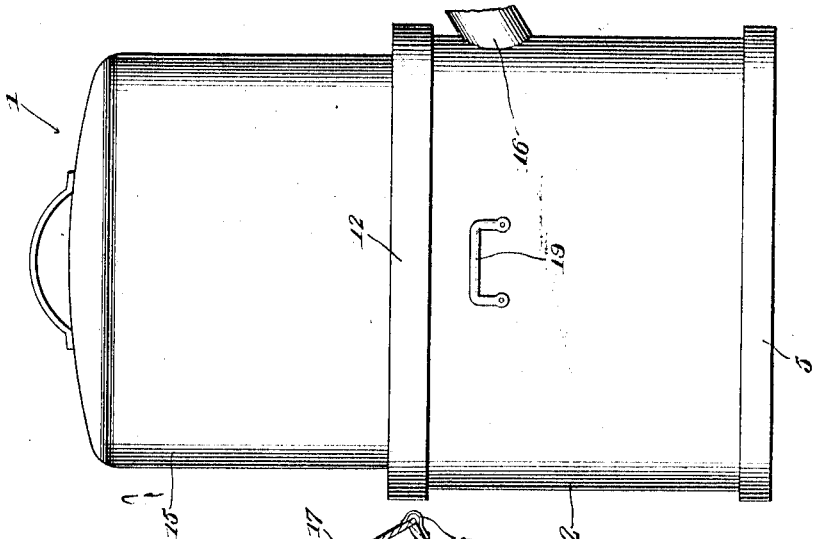
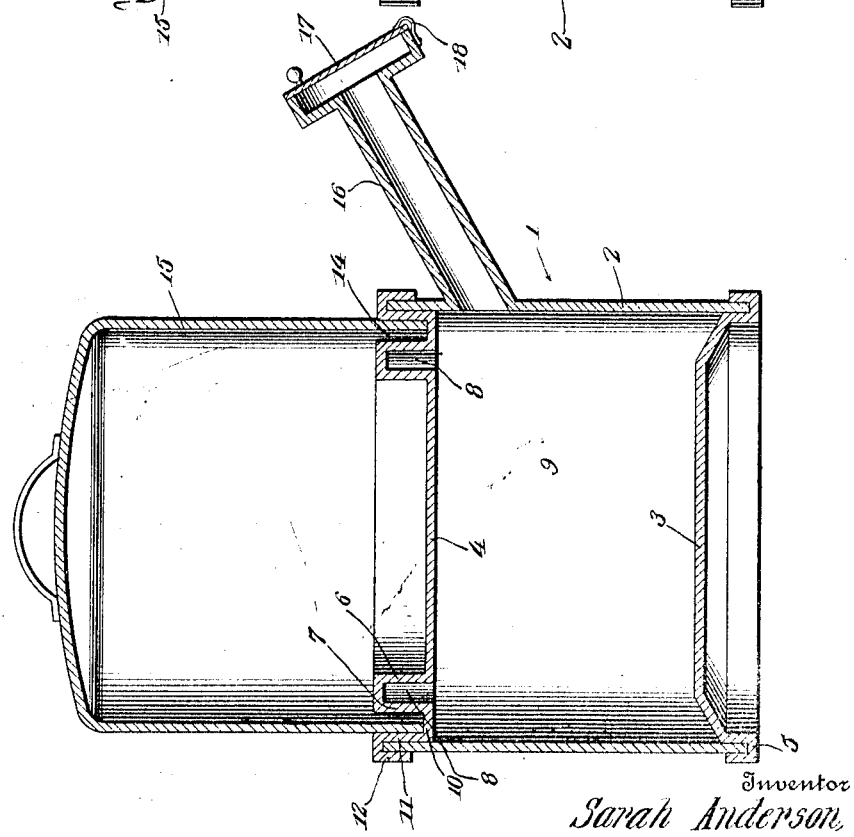
Witnesses
J. H. Crawford
Inventor
Sarah Anderson,
By Victor J. Evans
Attorney

UNITED STATES PATENT OFFICE.

SARAH ANDERSON, OF RIDGEWOOD, NEW JERSEY.

TABLE-SERVICE DEVICE.

1,022,290.      Specification of Letters Patent.      Patented Apr. 2, 1912.

Application filed July 22, 1911. Serial No. 639,935.

*To all whom it may concern:*

Be it known that I, SARAH ANDERSON, a citizen of the United States, residing at Ridgewood, in the county of Bergen and State of New Jersey, have invented new and useful Improvements in Table-Service Devices, of which the following is a specification.

This invention relates to table service devices and particularly to a container adapted for the reception of griddle cakes, the object of the invention being to provide means, whereby the heat of the cakes can be retained until it is desired to serve the same.

In the drawing, forming a portion of this specification and in which like numerals of reference indicate similar parts in the several views: Figure 1 is a side view of the device. Fig. 2 is a longitudinal section therethrough.

The device comprises a container 1 which includes the cylindrical main body walls 2, the bottom 3, and the top 4. The bottom 3 is disposed above the lower edges of the walls 2, and as illustrated, the edges of the bottom are upset, at 5, to securely embrace the lower edges of the walls 2, being soldered or otherwise suitably secured thereto. The top 4 forms the heating and supporting surface for the cakes to be cooked, and as illustrated, said top is provided with the inner spaced walls 6 and 7 which define the heating chamber 8 which is arranged in direct communication with the chamber 9 defined by the bottom 3, the top 4, and the walls 2 of the structure. The top 4 is also formed with a bottom-supporting portion 10 which is disposed in the same general plane preferably, with the main body portion of the top and formed integrally with the outer wall 11 of the top, the last named wall being upset, at 12, and arranged in embracing relation with the walls 2 at the upper edges thereof. The walls 7 and 11 are suitably spaced from each other so as to provide a cover-receiving space 14 which is adapted to receive the lower portion of the cover or hood 15. A hollow filling member 16 is arranged in communication with the chamber 9, being suitably secured to the walls 2 and provided for the purpose of permitting the filling of the chamber 9 with hot water. The outer open end of the member 16 is closed by a hinged cover member 17 to prevent the escape of the steam from the heating chamber. A spring 18 on the member 16 engages the said cover 17 and holds the same in a closed position. At the sides, the walls 2 are provided with suitable lifting handles 19.

In use, griddle cakes or the like after being fried are placed upon the top 4 of the device so as to be embraced by the wall 6, hot water first having been placed in the chamber 9 so as to thoroughly heat the walls of the device. The steam rising from the hot water in the chamber will escape into the heating chamber 8 to be utilized in thoroughly heating the wall 6, thereby providing for the most effective application of the heat to that point upon the structure upon which the articles in which the heat is to be retained are placed. The space 14 is somewhat in excess to the diameter of the walls of the cover 15 so that the water of condensation which may collect on the inner surface of the cover may drip into said space 14 and thereby held out of contact with the cakes.

I claim:

A serving dish comprising a member having a chamber portion adapted for the reception of a heating medium, and a top tray portion closing one end of the chamber and provided with a plurality of annular concentrically arranged spaced walls forming an intervening inner heating chamber and an outer cover-receiving space, and a cover removably fitted to the tray member and having a portion extending into the said cover-receiving space.

In testimony whereof I affix my signature in presence of two witnesses.

SARAH ANDERSON.

Witnesses:
    JENNIE M. DOREMUS,
    CORNELIUS DOREMUS.